US012722716B2

(12) United States Patent
Mika

(10) Patent No.: US 12,722,716 B2
(45) Date of Patent: Sep. 1, 2026

(54) VEHICLE BODY STRUCTURE WITH SIDE COLLISION SUPPRESSION

(71) Applicant: TOYOTA JIDOSHA KABUSHIKI KAISHA, Toyota (JP)

(72) Inventor: Takeshi Mika, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 342 days.

(21) Appl. No.: 18/395,749

(22) Filed: Dec. 26, 2023

(65) Prior Publication Data

US 2024/0286686 A1 Aug. 29, 2024

(30) Foreign Application Priority Data

Feb. 24, 2023 (JP) ................................ 2023-027800

(51) Int. Cl.
*B62D 25/20* (2006.01)

(52) U.S. Cl.
CPC .................................... *B62D 25/20* (2013.01)

(58) Field of Classification Search
CPC ...... B62D 21/03; B62D 21/152; B62D 21/15; B62D 21/157; B62D 25/20
See application file for complete search history.

(56) References Cited

U.S. PATENT DOCUMENTS 8,985,681 B2 * 3/2015 Fujii .................. B62D 25/2036 296/204
9,914,481 B2 * 3/2018 Kumagai ............... B62D 21/02
2009/0243343 A1 * 10/2009 Tamakoshi ......... B62D 25/2018 296/204
2016/0207572 A1 * 7/2016 Natsume ................ B62D 25/20
2017/0113729 A1 * 4/2017 Onishi ............... B62D 25/2036

FOREIGN PATENT DOCUMENTS

JP 2013163470 A * 8/2013
JP 2014-008798 A 1/2014

* cited by examiner

*Primary Examiner* — Robert E Fuller
(74) *Attorney, Agent, or Firm* — SOLARIS Intellectual Property Group, PLLC

(57) ABSTRACT

A vehicle body structure, that includes: a floor tunnel that protrudes from a floor panel toward a vehicle upper side and that extends in a vehicle front-rear direction; a pair of side members, the respective side members provided at each vehicle width direction side of the floor panel and extending in the vehicle front-rear direction; a pair of cross members that respectively extend in a vehicle width direction, each cross member coupling a respective one of the pair of side members and the floor tunnel; an underfloor brace that is provided at a vehicle lower side of the floor tunnel, at a vehicle front side of the pair of cross members or a vehicle rear side of the pair of cross members; and a pair of diagonal braces, each diagonal brace coupling a respective one of the pair of cross members and the underfloor brace.

5 Claims, 4 Drawing Sheets

VEHICLE BODY STRUCTURE WITH SIDE COLLISION SUPPRESSION

CROSS-REFERENCE TO RELATED APPLICATION

This application is based on and claims priority under 35 USC 119 from Japanese Patent Application No. 2023-027800, filed on Feb. 24, 2023, the disclosure of which is incorporated by reference herein.

BACKGROUND

Technical Field

The present disclosure relates to a vehicle body structure.

Related Art

Japanese Patent Application Laid-Open (JP-A) No. 2014-008798 discloses a vehicle rear portion structure in which a rear end portion of an under reinforcement (R/F) is fixedly supported by a rear side member with high general rigidity, via a brace. As a result thereof, when the under R/F attempts to displace toward the vehicle width direction inner side under a side-on collision load at a time of a pole side collision, movement of the rear end portion of the under R/F is suppressed by the brace and the rear side member with high rigidity.

SUMMARY

An aspect of the present disclosure is a vehicle body structure, comprising: a floor tunnel that protrudes from a floor panel toward a vehicle upper side and that extends in a vehicle front-rear direction; a pair of side members, the respective side members provided at each vehicle width direction side of the floor panel and extending in the vehicle front-rear direction; a pair of cross members that respectively extend in a vehicle width direction, each cross member coupling a respective one of the pair of side members and the floor tunnel; an underfloor brace that is provided at a vehicle lower side of the floor tunnel, at a vehicle front side of the pair of cross members or a vehicle rear side of the pair of cross members; and a pair of diagonal braces, each diagonal brace coupling a respective one of the pair of cross members and the underfloor brace.

DETAILED DESCRIPTION

First Exemplary Embodiment

Explanation follows regarding a vehicle body structure according to a first exemplary embodiment, with reference to the drawings. In the first exemplary embodiment, an example of a vehicle body structure according to an ordinary motor vehicle is explained. Note that the arrow FR illustrated in FIG. 1 indicates a front side in a vehicle front-rear direction, and the arrow RH indicates a right-hand side in a vehicle width direction.

Configuration of Vehicle Body Structure 10

Figure 1:
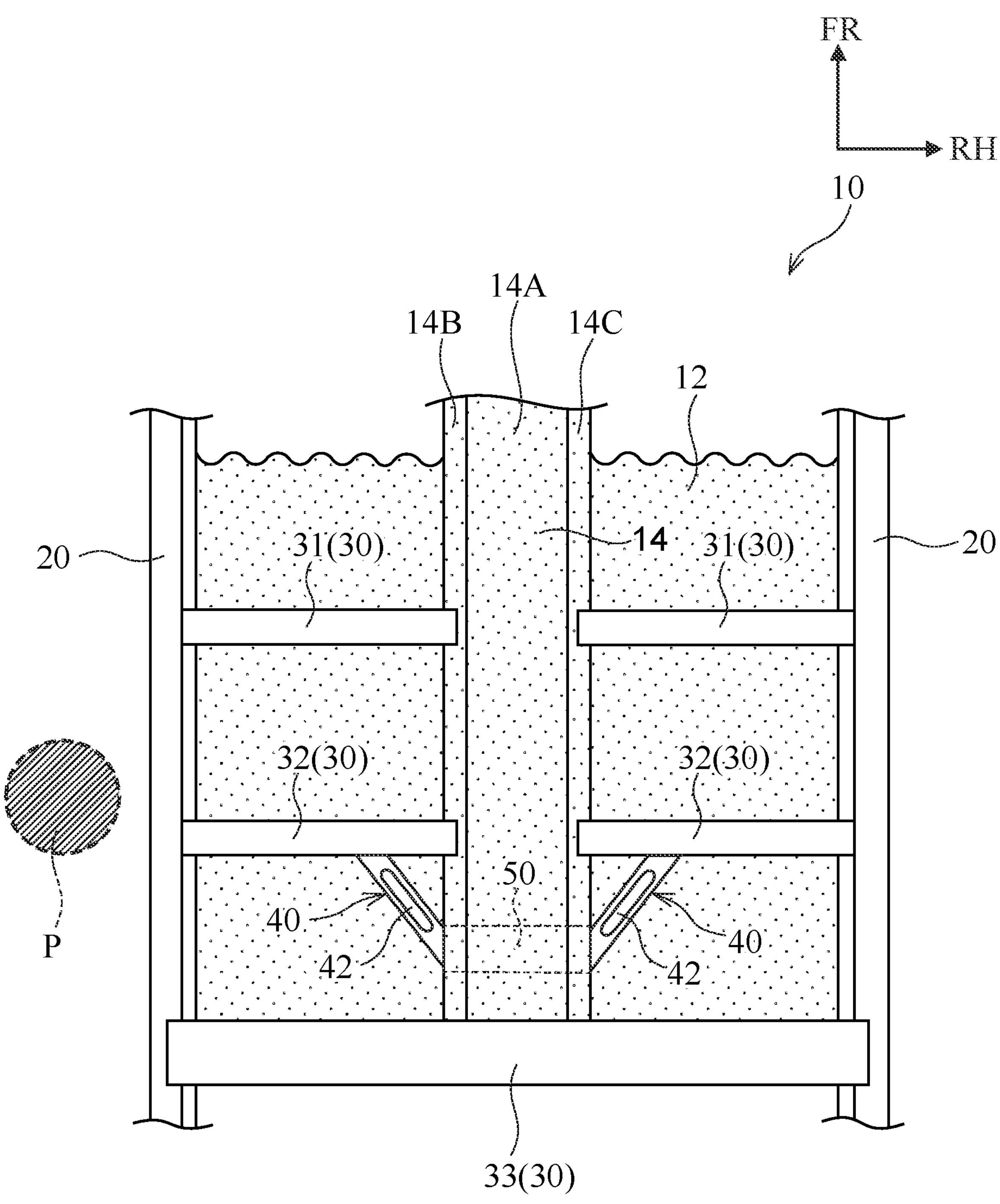
FIG. 1 is a plan view schematically illustrating an example of a vehicle body structure according to a first exemplary embodiment.

As illustrated in FIG. 1, a vehicle body structure 10 includes a floor panel 12, side members 20, cross members 30, diagonal braces 40, and a first underfloor brace 50 serving as an underfloor brace.

Floor Panel 12

The floor panel 12 is provided at a lower portion of the vehicle, and configures a floor of a vehicle cabin. The floor panel 12 is formed from a plate material having a substantially rectangular shape with a plate thickness direction of the floor panel 12 being in a vehicle vertical direction.

A floor tunnel 14, which is formed by causing the floor panel 12 to protrude toward a vehicle upper side, is provided at a vehicle width direction center portion of the floor panel 12. The floor tunnel 14 is formed in a substantially U-shape in cross-section, which is open toward a vehicle lower side. The floor tunnel 14 is formed extending in the vehicle front-rear direction. The floor tunnel 14 includes a left side face 14B at a vehicle left side, a right side face 14C at a vehicle right side, and an upper face 14A that connects an upper end portion of the left side face 14B and an upper end portion the right side face 14C.

A vehicle front side end portion of the floor tunnel 14 is joined to a dash panel. A vehicle rear side end portion of the floor tunnel 14 is joined to a center cross member 33 that extends in the vehicle width direction.

Side Members 20

As the side members 20, a left and right pair of side members 20 are respectively provided at each vehicle width direction side of the floor panel 12. The pair of side members 20 are disposed substantially parallel to each other, and extend in the vehicle front-rear direction. Each vehicle width direction outer side end portion of the floor panel 12 is coupled to a respective one of the left and right pair of side members 20 by, for example, spot welding or the like.

Cross Members 30

The cross members 30 include first cross members 31, second cross members 32, and the center cross member 33.

First Cross Members 31

As the first cross members 31, a left and right pair of first cross members 31 are provided, each of the left and right pair of first cross members 31 being provided between a respective one of the left and right pair of side members 20 and the floor tunnel 14. The pair of first cross members 31 are provided at a vehicle upper side of the floor panel 12. Each of the pair of first cross members 31 is provided extending in the vehicle width direction at substantially the same position in the vehicle front-rear direction. Each first cross member 31 is formed in a substantially U-shape in cross-section, which is open toward the vehicle lower side.

The first cross member 31 is provided so as to span between the side member 20 and the floor tunnel 14. A vehicle width direction outer side end portion of the first cross member 31 is coupled to the side member 20 by, for example, spot welding or the like. A vehicle width direction inner side end portion of the first cross member 31 is coupled to the floor tunnel 14 by, for example, spot welding or the like. A flange portion at an opening portion of the first cross member 31 is coupled to the floor panel 12 by, for example, spot welding or the like. As a result, a closed cross-section shape is formed by the first cross member 31 and the floor panel 12.

Second Cross Members 32

Second cross members 32 are provided further toward a vehicle rear side than the first cross members 31. As the second cross members 32, a left and right pair of second cross members 32 are provided, each of the left and right pair of second cross members 32 being provided between a respective one of the left and right pair of side members 20 and the floor tunnel 14. The pair of second cross members 32 are provided at the vehicle upper side of the floor panel 12. Each of the pair of second cross members 32 is provided extending in the vehicle width direction at substantially the same position in the vehicle front-rear direction. Each second cross member 32 is formed in a substantially U-shape in cross-section, which is open toward the vehicle lower side.

The second cross member 32 is provided so as to span between the side member 20 and the floor tunnel 14. A vehicle width direction outer side end portion of the second cross member 32 is coupled to the side member 20 by, for example, spot welding or the like. A vehicle width direction inner side end portion of the second cross member 32 is coupled to the floor tunnel 14 by, for example, spot welding or the like. A flange portion at an opening portion of the second cross member 32 is coupled to the floor panel 12 by, for example, spot welding or the like. As a result, a closed cross-section shape is formed by the second cross member 32 and the floor panel 12.

Center Cross Member 33

The center cross member 33 is provided further toward the vehicle rear side than the second cross members 32. The center cross member 33 is provided so as to span between the left and right pair of side members 20. The center cross member 33 is provided at the vehicle upper side of the floor panel 12.

Each vehicle width direction outer side end portion of the center cross member 33 is coupled to a respective one of the left and right pair of side members 20 by, for example, spot welding or the like. A vehicle front side end portion of the center cross member 33 is coupled to a vehicle rear side end portion of the floor panel 12 by, for example, spot welding or the like.

Diagonal Braces 40

As the diagonal braces 40, a left and right pair of diagonal braces 40 are provided, each of the diagonal braces 40 being provided between a respective one of the left and right pair of side members 20 and the floor tunnel 14. The pair of diagonal braces 40 is provided between the pair of second cross members 32 and the center cross member 33 in the vehicle front-rear direction.

The diagonal brace 40 is formed in a substantially rectangular plate shape with a plate thickness direction of the diagonal brace 40 being in the vehicle vertical direction. A bead 42 that has a cross-section protruding out toward the vehicle upper side or the vehicle lower side and that extends in a length direction of the diagonal brace 40 is formed at the diagonal brace 40.

The diagonal brace 40 is provided so as to reinforce the inner corner between the second cross member 32 and the floor tunnel 14. The diagonal brace 40 is provided so as to span between the second cross member 32 and the floor tunnel 14.

One end of the diagonal brace 40 is provided further toward a vehicle inner side than a vehicle width direction center portion of the second cross member 32. The one end of the diagonal brace 40 is coupled to the flange portion at the opening portion of the second cross member 32 by, for example, spot welding or the like. The other end of the diagonal brace 40 is provided at a position that is substantially intermediate between the second cross member 32 and the center cross member 33 in the vehicle front-rear direction. The other end of each diagonal brace 40 is coupled to the floor panel 12 by, for example, spot welding or the like.

The diagonal brace 40 is provided inclined with respect to the vehicle front-rear direction so as to come closer to the vehicle width direction inner side toward the vehicle rear side.

First Underfloor Brace 50

The first underfloor brace 50 is formed in a substantially rectangular plate shape with a plate thickness direction of the first underfloor brace 50 being in the vehicle vertical direction. The first underfloor brace 50 extends in the vehicle width direction, and couples the left side face 14B and the right side face 14C.

The first underfloor brace 50 is provided at a vehicle lower side of the floor tunnel 14. The first underfloor brace 50 is provided at the vehicle rear side with respect to the second cross members 32. Each end portion of the first underfloor brace 50 is provided at a position that is substantially intermediate between the second cross member 32 and the center cross member 33 in the vehicle front-rear direction. In other words, each end portion of the first underfloor brace 50 is provided in the vicinity of the other end of a respective one of the left and right pair of diagonal braces 40. As a result, the diagonal brace 40 is provided so as to couple the first underfloor brace 50 and the second cross member 32. Note that the end portion of the first underfloor brace 50 may be joined to the other end of the diagonal brace 40.

Operation

Figure 3:
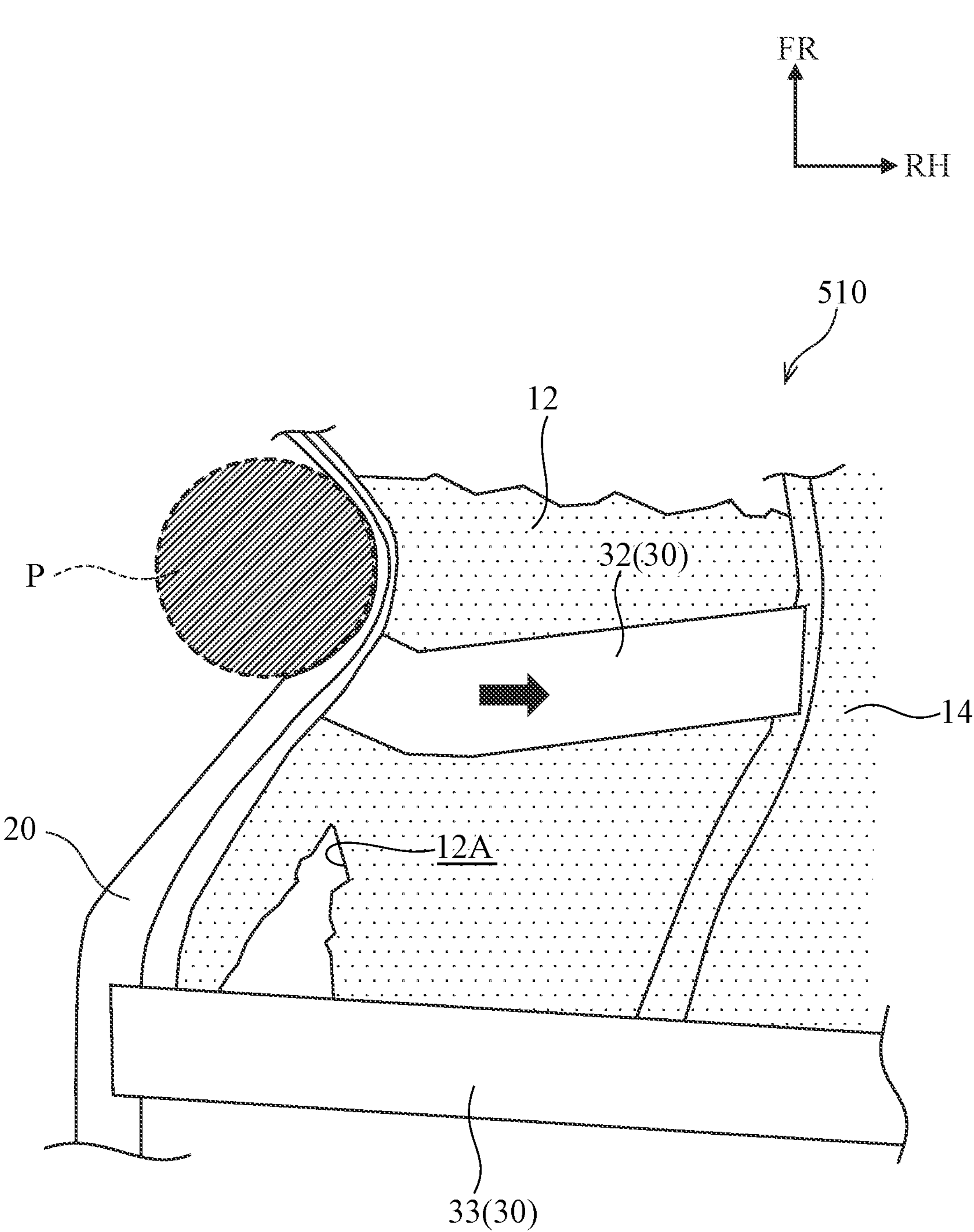
FIG. 3 is a schematic diagram illustrating an enlarged view of an example of a vehicle body structure according to a comparative example at a time of a pole side collision.

As illustrated in FIG. 3, in the case of a vehicle body structure 510 that does not include the diagonal braces 40, at a time at which there is a collision with a pole (collision body) P from a vehicle width direction outer side of the vehicle body structure 510 toward a vehicle width direction inner side (at a time of a so-called pole side collision), the side member 20 is bent toward the vehicle width direction inner side from a portion of the side member 20 at which the pole P has collided.

At this time, a collision load is transmitted to the second cross member 32 via the side member 20, and the floor tunnel 14 is bent toward the vehicle width direction inner side.

The vehicle body structure 10 according to the first exemplary embodiment includes: the floor tunnel 14 that protrudes from the floor panel 12 toward the vehicle upper side and that extends in the vehicle front-rear direction; the pair of side members 20, the respective side members 20 provided at each vehicle width direction side of the floor panel 12 and extending in the vehicle front-rear direction; the pair of second cross members 32 that respectively extend in a vehicle width direction, each second cross member 32 coupling a respective one of the pair of side members 20 and the floor tunnel 14; the first underfloor brace 50 that is provided at the vehicle lower side of the floor tunnel 14, at the vehicle rear side of the pair of second cross members 32; and the pair of diagonal braces 40, each diagonal brace 40 coupling a respective one of the pair of second cross members 32 and the first underfloor brace 50 (see FIG. 1).

Figure 2:
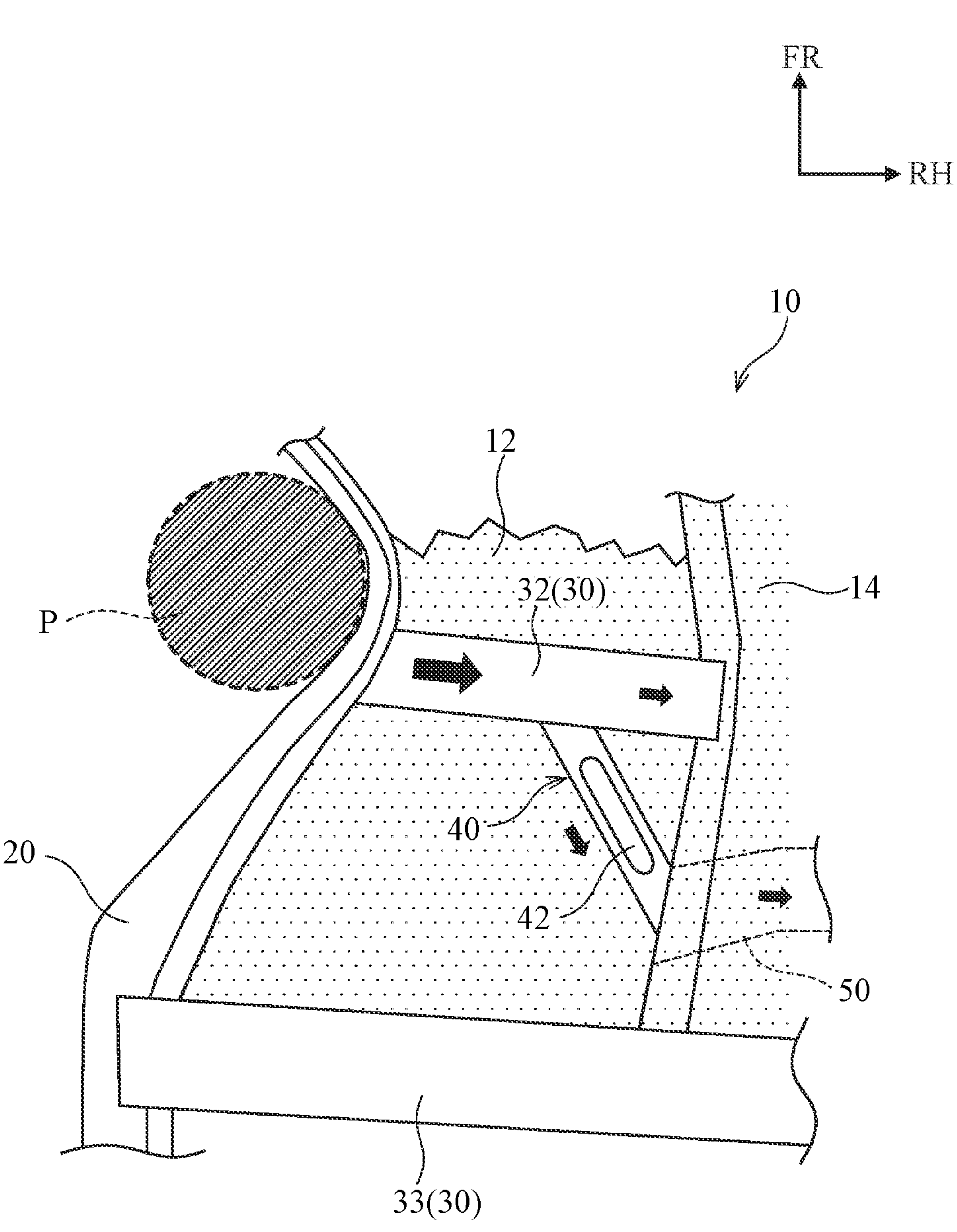
FIG. 2 is a schematic diagram illustrating an enlarged view of an example of a portion of a vehicle body structure according to the first exemplary embodiment at a time of a pole side collision.

As illustrated in FIG. 2, by including the diagonal brace 40 that couples the first underfloor brace 50 and the second cross member 32, at a time of a vehicle side-on collision (in particular, at a time of a pole side collision), a load transmitted from the second cross member 32 is distributed from the diagonal brace 40 to the first underfloor brace 50. Therefore, concentration of the load on the floor tunnel 14 is avoided, and deformation of the floor tunnel 14 is suppressed. As a result, displacement toward the vehicle width direction inner side at a time of a vehicle side-on collision can be suppressed.

As illustrated in FIG. 3, in a case in which no diagonal brace 40 is provided, at a time of a vehicle side-on collision (in particular, at a time of a pole side collision), a load transmitted from the second cross member 32 is not distributed and is transmitted to the floor tunnel 14. Therefore, the load is concentrated on the floor tunnel 14, and the floor tunnel 14 is deformed. Further, the second cross member 32 is deformed so as to be bent in a direction toward the floor tunnel 14. As a result, relative displacement between the second cross member 32 and the center cross member 33 becomes greater, and cracks 12A may occur in the floor panel 12.

In the vehicle body structure 10 according to the first exemplary embodiment, the diagonal brace 40 is provided between the center cross member 33, which extends in the vehicle width direction and spans between the pair of side members 20, and each of the pair of side members 20 that are respectively provided at a vehicle front side of the center cross member 33 (see FIG. 1).

By the diagonal brace 40 being provided between the center cross member 33, which extends in the vehicle width direction and spans the pair of side members 20, and each of the pair of the side members 20 that are respectively provided at the vehicle front side of the center cross member 33, as illustrated in FIG. 2, at a time of a vehicle side-on collision (in particular, at a time of a pole side collision), a load transmitted from the second cross member 32 is distributed from the diagonal brace 40 to the first underfloor brace 50. Therefore, concentration of the load on the floor tunnel 14 is avoided, and deformation of the floor tunnel 14 is suppressed. Further, deformation in which the second cross member 32 is bent in a direction toward the floor tunnel 14 is suppressed. This enables relative displacement between the second cross member 32 and the center cross member 33 to be suppressed, and enables cracking to be prevented from occurring in the floor panel 12.

In addition, by providing the diagonal brace 40, deformation of the floor panel 12 in the out-of-plane direction is suppressed. This enables cracks to be further suppressed from occurring in the floor panel 12.

In the vehicle body structure 10 according to the first exemplary embodiment, the diagonal brace 40 is provided further toward the vehicle inner side than the vehicle width direction center portion of the second cross member 32 (see FIG. 1).

By the diagonal brace 40 bring provided further toward the vehicle inner side than the vehicle width direction center portion of the second cross member 32, the size of the diagonal brace 40 is reduced. This enables a vehicle body structure with reduced weight to be obtained.

In the vehicle body structure 10 according to the first exemplary embodiment, a bead 42 is formed at the diagonal brace 40 (see FIG. 1).

By the bead 42 being formed at the diagonal brace 40, the rigidity of the diagonal brace 40 is improved compared to a case in which the bead 42 is not formed at the diagonal brace 40. This further suppresses deformation of the floor tunnel 14.

Second Exemplary Embodiment

A vehicle body structure according to a second exemplary embodiment is different from the vehicle body structure according to the first exemplary embodiment in that the arrangement of the underfloor brace is different.

Explanation follows regarding a vehicle body structure according to the second exemplary embodiment. Note that description of the same or equivalent portions as those in the first exemplary embodiment is made using the same terminology or the same reference numerals.

Configuration

Figure 4:
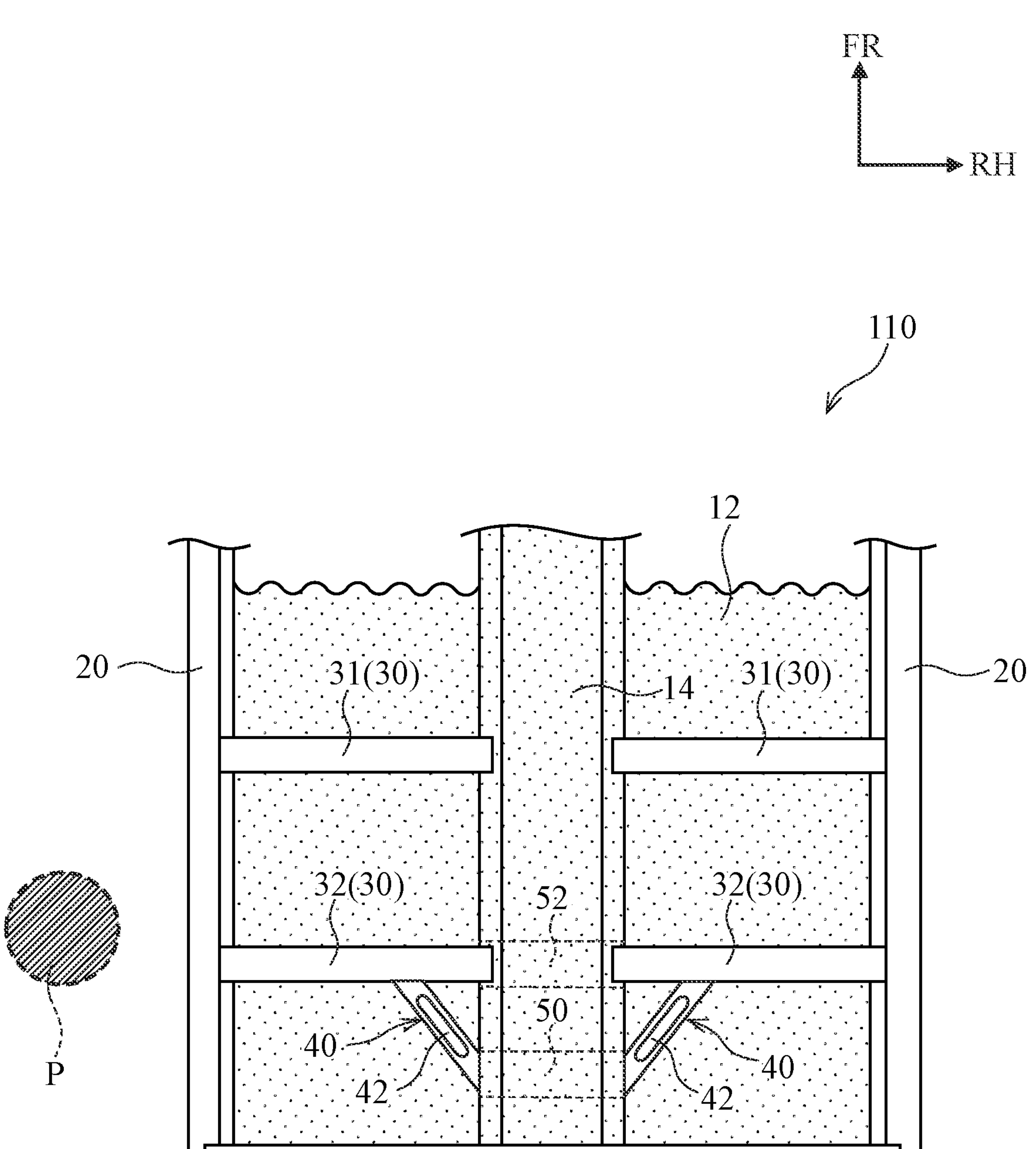
FIG. 4 is a plan view schematically illustrating an example of a vehicle body structure according to a second exemplary embodiment.

As illustrated in FIG. 4, a vehicle body structure 110 includes a second underfloor brace 52 serving as an underfloor brace. The second underfloor brace 52 is formed in a substantially rectangular plate shape with a plate thickness direction of the second underfloor brace 52 being in the vehicle vertical direction. The second underfloor brace 52 extends in the vehicle width direction, and couples the left side face 14B and the right side face 14C.

The second underfloor brace 52 is provided at the vehicle lower side of the floor tunnel 14. The second underfloor brace 52 is provided at substantially the same position as the pair of second cross members 32 in the vehicle front-rear direction. As a result, the pair of second cross members 32 are provided so as to be coupled to the second underfloor brace 52.

Operation

In the vehicle body structure 110 according to the second exemplary embodiment, the second underfloor brace 52, which couples one second cross member 32 and the other second cross member 32, is provided at the vehicle lower side of the floor tunnel 14 (see FIG. 4).

By the second underfloor brace 52, which couples the one second cross member 32 and the other second cross member 32, being provided at the vehicle lower side of the floor tunnel 14, at a time of a vehicle side-on collision (in particular, at a time of a pole side collision), a load transmitted from the second cross member 32 is distributed to the second underfloor brace 52. Therefore, concentration of the load on the floor tunnel 14 is avoided, and deformation of the floor tunnel 14 is suppressed. As a result, displacement toward the vehicle width direction inner side at a time of a vehicle side-on collision can be suppressed.

Note that other configurations and operation and advantageous effects are substantially the same as those in the above-described first exemplary embodiment, and explanation thereof is omitted.

The vehicle body structures according to exemplary embodiments have been explained based on the first exemplary embodiment and the second exemplary embodiment. However, specific configurations are not limited to these exemplary embodiments, and changes in design or the like are permissible within a range not departing from the gist of the present disclosure.

In the first exemplary embodiment and the second exemplary embodiment, examples have been described in which the diagonal brace 40 is provided so as to span between the second cross member 32 and the floor tunnel 14. However, the diagonal brace 40 may be provided so as to span between another cross member and the floor tunnel 14.

Note that in a vehicle body structure, it is preferable to suppress displacement toward the vehicle width direction inner side at a time of a vehicle side-on collision.

An object of the present disclosure is to provide a vehicle body structure that is capable of suppressing displacement toward the vehicle width direction inner side at a time of a vehicle side-on collision.

A first aspect of the present disclosure is a vehicle body structure, comprising: a floor tunnel that protrudes from a floor panel toward a vehicle upper side and that extends in a vehicle front-rear direction; a pair of side members, the respective side members provided at each vehicle width direction side of the floor panel and extending in the vehicle front-rear direction; a pair of cross members that respectively extend in a vehicle width direction, each cross member coupling a respective one of the pair of side members and the floor tunnel; an underfloor brace that is provided at a vehicle lower side of the floor tunnel, at a vehicle front side of the pair of cross members or a vehicle rear side of the pair of cross members; and a pair of diagonal braces, each diagonal brace coupling a respective one of the pair of cross members and the underfloor brace.

In the vehicle body structure according to the first aspect, by including the pair of diagonal braces, each diagonal brace coupling a respective one of the pair of cross members and the underfloor brace, a load transmitted from the cross member is distributed from the diagonal brace to the underfloor brace at a time of a vehicle side-on collision (in particular, at a time of a pole side collision). Therefore, concentration of the load on the floor tunnel is avoided, and deformation of the floor tunnel is suppressed. As a result, displacement toward the vehicle width direction inner side at a time of a vehicle side-on collision can be suppressed.

A second aspect of the present disclosure is the vehicle body structure according to the first aspect, wherein each diagonal brace is provided between a center cross member, which extends in the vehicle width direction and spans between the pair of side members, and a respective one of the pair of side members that are provided at a vehicle front side of the center cross member.

In the vehicle body structure according to the second aspect, by each diagonal brace being provided between the center cross member, which extends in the vehicle width direction and spans between the pair of side members, and a respective one of the pair of side members that are provided at the vehicle front side of the center cross member, a load transmitted from the cross member is distributed from the diagonal brace to the underfloor brace at a time of a vehicle side-on collision (in particular, at a time of a pole side collision). Therefore, concentration of the load on the floor tunnel is avoided, and deformation of the floor tunnel is suppressed. As a result, relative displacement between the cross member and the center cross member is suppressed, and cracking of the floor panel can be suppressed.

A third aspect of the present disclosure is the vehicle body structure according to the first aspect, wherein each diagonal brace is provided further toward a vehicle width direction inner side than a vehicle width direction center portion of a respective one of the pair of cross members.

In the vehicle body structure according to the third aspect, by each diagonal brace being provided further toward the vehicle width direction inner side than the vehicle width direction center portion of a respective one of the pair of cross members, the size of the diagonal brace is reduced compared to a case in which one end of the diagonal brace is provided further toward a vehicle outer side than the vehicle width direction center portion of the cross member. This enables a vehicle body structure with reduced weight to be obtained.

A fourth aspect of the present disclosure is the vehicle body structure according to the first disclosure, wherein a bead is formed at each diagonal brace.

In the vehicle body structure according to the fourth aspect, by a bead being formed at each diagonal brace, the rigidity of the diagonal brace is improved compared to a case in which a bead is not formed at the diagonal brace. This further suppresses deformation of the floor tunnel.

A fifth aspect of the present disclosure is the vehicle body structure according to the first disclosure, wherein a second underfloor brace is provided at the vehicle lower side of the floor tunnel, the second underfloor brace coupling one of the pair of cross members and another one of the pair of cross members.

In the vehicle body structure according to the fifth aspect, by the second underfloor brace, which couples one of the pair of cross members and the other one of the pair of cross members, being provided at the vehicle lower side of the floor tunnel, a load transmitted from the cross member is distributed to the second underfloor brace at a time of a vehicle side-on collision (in particular, at a time of a pole side collision). Therefore, concentration of the load on the floor tunnel is avoided, and deformation of the floor tunnel is suppressed. As a result, displacement toward the vehicle width direction inner side at a time of a vehicle side-on collision can be suppressed.

As explained above, the vehicle body structure according to the present disclosure enables displacement toward the vehicle width direction inner side at a time of a vehicle side-on collision to be suppressed.

What is claimed is:

1. A vehicle body structure, comprising:

a floor tunnel that protrudes from a floor panel toward a vehicle upper side and that extends in a vehicle front-rear direction;

a pair of side members, the respective side members provided at each vehicle width direction side of the floor panel and extending in the vehicle front-rear direction;

a pair of cross members that respectively extend in a vehicle width direction, each cross member coupling a respective one of the pair of side members and the floor tunnel;

an underfloor brace that is provided at a vehicle lower side of the floor tunnel, at a vehicle front side of the pair of cross members or a vehicle rear side of the pair of cross members; and a pair of diagonal braces, each diagonal brace coupling a respective one of the pair of cross members and the underfloor brace.

2. The vehicle body structure according to claim 1, wherein each diagonal brace is provided between a center cross member, which extends in the vehicle width direction and spans between the pair of side members, and a respective one of the pair of cross members that are provided at a vehicle front side of the center cross member.

3. The vehicle body structure according to claim 1, wherein each diagonal brace is provided further toward a vehicle width direction inner side than a vehicle width direction center portion of a respective one of the pair of cross members.

4. The vehicle body structure according to claim 1, wherein a bead is formed at each diagonal brace.

5. The vehicle body structure according to claim 1, wherein a second underfloor brace is provided at the vehicle lower side of the floor tunnel, the second underfloor brace coupling one of the pair of cross members and another one of the pair of cross members.

* * * * *